(12) United States Patent
Sneitzer et al.

(10) Patent No.: US 6,529,173 B1
(45) Date of Patent: Mar. 4, 2003

(54) AUTOMATIC ANTENNA DIRECTION CONTROLLER

(75) Inventors: David R. Sneitzer, Cedar Rapids, IA (US); Robert C. Locher, Jr., Geyserville, CA (US)

(73) Assignee: Idiom Press, Geyserville, CA (US)

( * ) Notice: Subject to any disclaimer, the term of this patent is extended or adjusted under 35 U.S.C. 154(b) by 0 days.

(21) Appl. No.: 09/837,708

(22) Filed: Apr. 18, 2001

(51) Int. Cl.$^7$ ................................................. G05B 5/01
(52) U.S. Cl. ........................................ 343/894; 318/614
(58) Field of Search .............................. 318/600, 604, 318/664, 614, 624, 621, 566, 286, 369; 343/766; 455/158.1

(56) References Cited

U.S. PATENT DOCUMENTS 4,325,014 A * 4/1982 Jeck ............................ 318/614
5,214,364 A * 5/1993 Perdue et al. ................ 318/600

* cited by examiner

Primary Examiner—Don Wong
Assistant Examiner—James Clinger
(74) Attorney, Agent, or Firm—Hugh D. Jaeger

(57) ABSTRACT

An automatic antenna direction controller which automatically turns an antenna rotor and connected antenna to a desired direction which is preselected by a pointer knob. A dual use meter needle is utilized by action of the pointer knob to select the azimuth of an antenna and to indicate the actual azimuth. A multi-color status LED indicator indicates different colors corresponding to the percentage of rotational completion completed. Control is offered by onboard circuitry for automatic brake release and setting, preset electronic end points for rotation limits, overshoot protection, and an unstick routine. Optional control can also be managed by an outboard computer through an RS-232 connection.

18 Claims, 6 Drawing Sheets

AUTOMATIC ANTENNA DIRECTION CONTROLLER

CROSS REFERENCES TO CO-PENDING APPLICATIONS

None.

BACKGROUND OF THE INVENTION

1. Field of the Invention

The present invention is for a radio antenna device and, more particularly, is for an automatic antenna direction controller which controls the rotation of a radio antenna while utilizing a meter for setting of an indication of an antenna heading.

2. Description of the Prior Art

Antenna rotating devices often incorporate a controller operated rotor system to rotate antenna arrays of various sizes substantially about a 360° arc in order to point or aim an antenna array towards a radio station with which two way radio communications is desired in order to maximize signal strength. Antenna arrays often are of such great physical size and dimension that rotation to a desired heading is accomplished over a length of time in which a radio operator must manually depress and hold a control switch until such desired direction is obtained. Often such manual operation of the control switch is lengthy and as such diverts the radio operator's attention from other aspects of operation of a radio station, especially in such events as high speed radio contest events or in rapidly bringing the station into operation for contact with radio stations where flexibility and quickness of operation of the station result in a successful and timely radio contact. Other problems also exist in antenna rotational systems where a brake is incorporated. Often the brake is immediately set when the directional switch is released, thus engaging the brake prior to coast down of the antenna and rotor. The brake system, the rotor motor, the antenna and the antenna tower adversely absorb the shock of the instant brake application, thus potentially damaging the involved components thereof. Other problems encountered with prior art systems are at or near the rotational limits of the rotor motor where gear sticking, jamming, or other gear problems occur as the rotational stops are impinged. Still other problems occur where the momentum of the rotating antenna array carries the array past the desired direction. In such cases the antenna must be brought back to the desired heading. Yet another problem encountered with some rotors is that of a sticky brake where an unsticking routine must be accomplished to unstick a stuck brake. Clearly what is needed is an antenna direction controller which is automatic in operation and which overcomes the deficiencies and disadvantages of prior art devices.

SUMMARY OF THE INVENTION

The general purpose of the present invention is to provide an automatic antenna direction controller.

According to one or more embodiments of the present invention, there is provided an automatic antenna direction controller for mounting in a rotor control box. The automatic antenna direction controller connects and interfaces with components in pre-existing or newly fashioned rotor control boxes to control antenna direction automatically (or manually) as desired. A dual use meter needle is utilized to either select a heading or to indicate a heading. In automatic operation, a heading selection is controlled by the meter needle which is steerable by a pointer knob where the meter needle indicates the direction in which an antenna is to be pointed, the result of which is either a clockwise or a counterclockwise rotation commanded by a command/brake release paddle switch. Manual operation is provided for by the command/brake release paddle switch for manually releasing an antenna brake and by paddle switches for manually directed rotation of the antenna in either a clockwise or a counterclockwise direction. Also included are a multi-color light emitting diode (LED) for annunciating rotational status with respect to the percentage of rotation completer, a red LED which annunciated brake release, a red LED which annunciated counterclockwise antenna rotation in the automatic and manual mode, and a red LED which annunciated clockwise antenna rotation in the automatic and manual mode. Optional user selectable provisions are also provided for an unstick routine option, as later explained in detail. The automatic antenna direction controller can be furnished in a kit form or installed in a factory-built rotor control box.

One significant aspect and feature of the present invention is an automatic antenna direction controller which can be installed in an existing rotor control box or which can be included in newly fashioned rotor control boxes.

Another significant aspect and feature of the present invention is an automatic antenna direction controller which provides for automatic hands-off operation after bearing selection.

Another significant aspect and feature of the present invention is an automatic antenna direction controller which provides for manual operation.

Still another significant aspect and feature of the present invention is an automatic antenna direction controller which incorporates a pointing control knob and which selects the desired heading by positioning a meter needle which also displays the heading of the rotor and antenna.

Yet another significant aspect and feature of the present invention is an automatic antenna direction controller which provides a delayed brake application in an automatic or manual rotational mode.

A further significant aspect and feature of the present invention is the inclusion of an optional unstick routine for a sticky brake.

A still further significant aspect and feature of the present invention is the inclusion of optional electronic end points near the rotational limits.

A still further significant aspect and feature of the present invention is the inclusion of an electronic overshoot option.

Still another significant aspect and feature of the present invention is the use of a multi-color status LED, the color of which is displayed is based on the percentage of rotation completed.

Yet another significant aspect and feature of the present invention is an open pot algorithm/wiggle. In the event a valid pot reading is not attainable, the system will estimate the current position and annunciate that the position is estimated by oscillating the meter +/− at a rate of 5 Hertz.

Still another significant aspect and feature of the present invention is a 90° offset mode for use where an antenna utilizing the same rotor may be mounted at a right angle to another antenna.

Having thus enumerated significant aspects and features of embodiments of the present invention, it is the principal object of the present invention to provide an automatic antenna direction controller.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
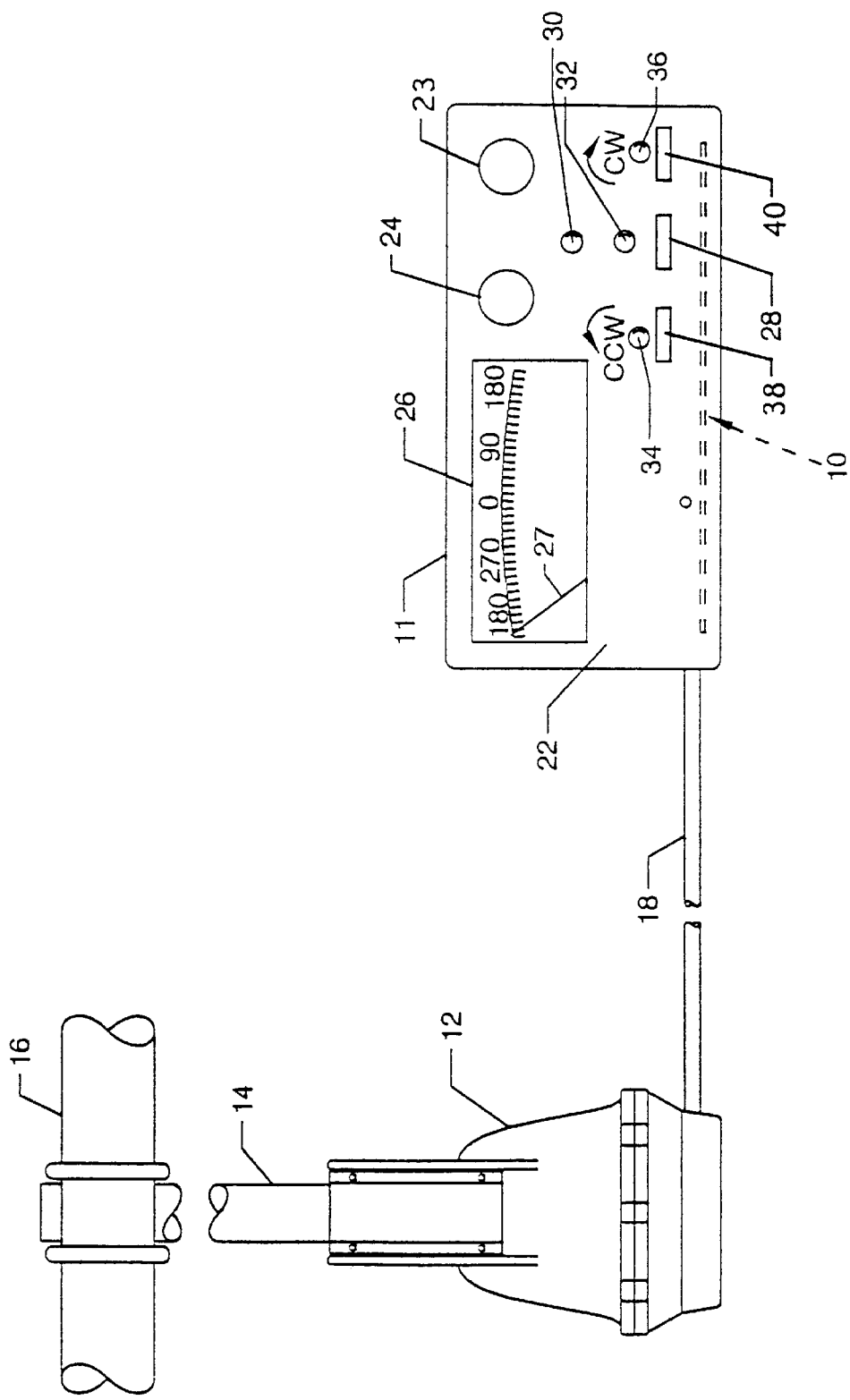
FIG. 1 illustrates a front view of an automatic antenna direction controller, the present invention, shown in use with a rotor control box, a rotor, a mast extending from the rotor, and a boom of an antenna array.

FIG. 1 illustrates an automatic antenna direction controller 10, the present invention, shown mounted in and incorporated into use with a rotor control box 11, rotor 12, a mast 14 extending from the rotor 12, a boom 16, which is part of an antenna array secured to the mast 14, and a control cable 18 connecting the rotor control box 11 to the rotor 12. The automatic antenna direction controller 10 is suitably mounted in the rotor control box 11 and is connected to components of the rotor control box 11 as well as to components in the rotor 12. Located on the front panel 22 of the rotor control box 11 are an on/off switch 23, a pointer knob 24 which connects to a set point potentiometer 20 of the rotor box 11 (FIGS. 2A–2C), a direction indicator meter 26 having a meter needle 27, a command/brake release paddle switch 28, a counterclockwise paddle switch 38, a clockwise paddle switch 40, a multi-color status LED 30, a red brake release LED 32, a red counterclockwise rotation LED 34 and a red clockwise rotation LED 36. The pointer knob 24 is primarily incorporated in an automatic mode to determine the direction in which an antenna array is to be pointed by positioning or steering the meter needle 27; and the command/brake release paddle switch 28 is primarily incorporated as an "enter command" in the automatic mode, as well as to release the rotor brake in either the automatic or the manual mode of operation. An RS-232 plug is provided on a rear panel of the rotor control box 11 for alternate computer interface and control.

Figure 2:
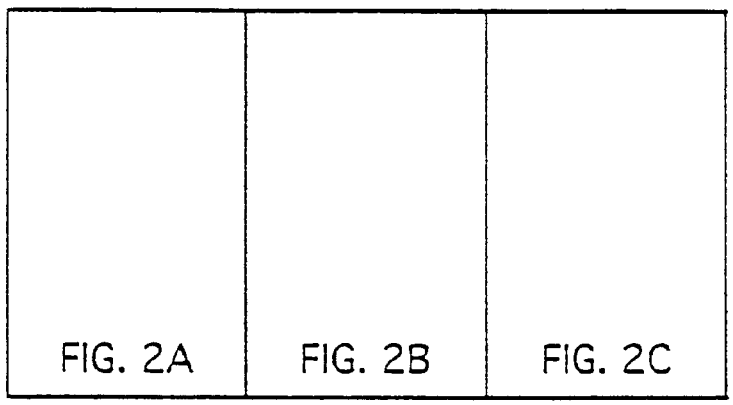
FIG. 2 illustrates the relative alignment of FIGS. 2A, 2B and 2C.
Figure 2A:
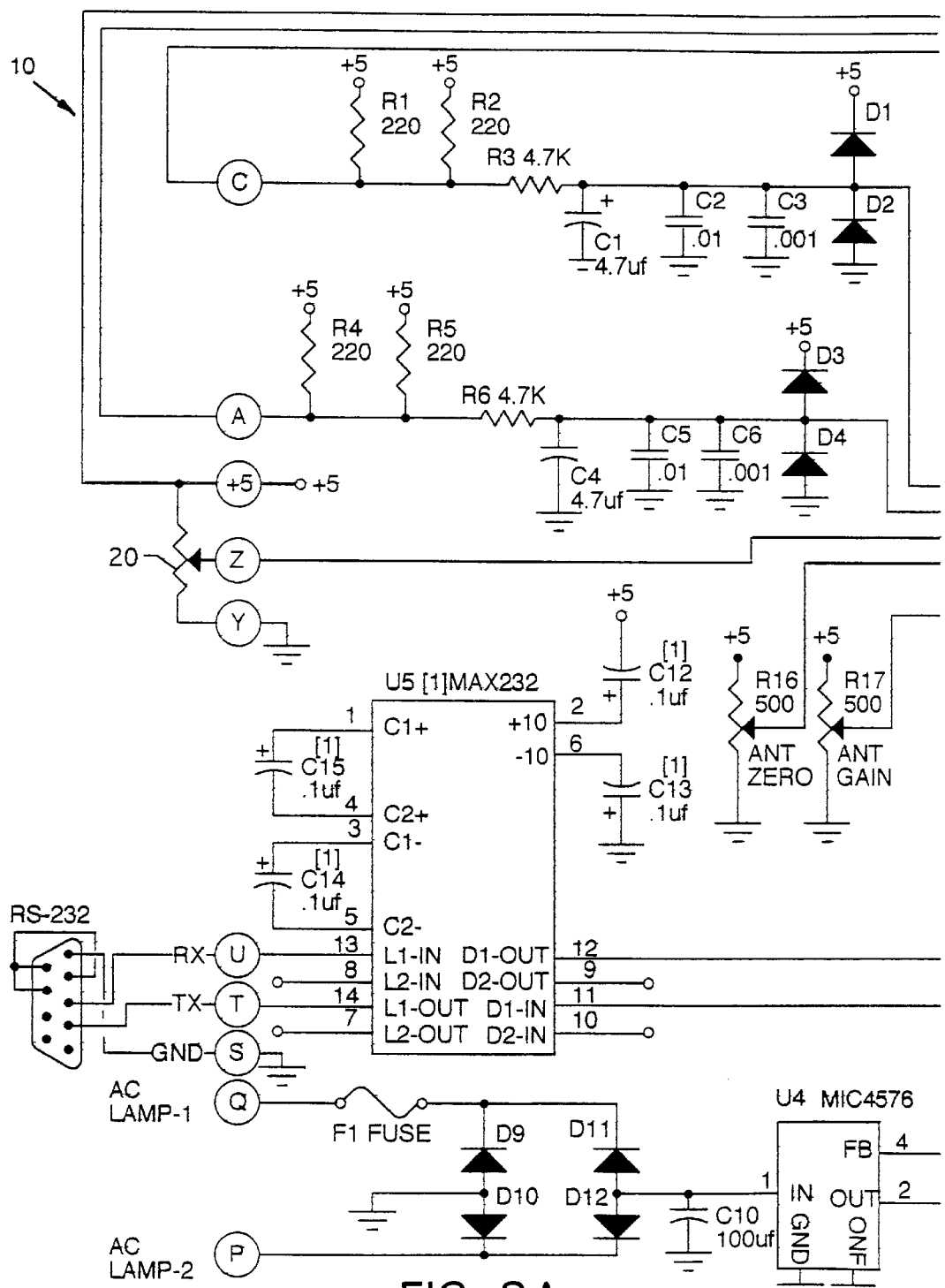
FIGS. 2A, 2B and 2C illustrate the automatic antenna direction controller control circuit schematic; and, FIG. 3 illustrates a state transition chart indicating operation of the automatic antenna direction controller.
Figure 2B:
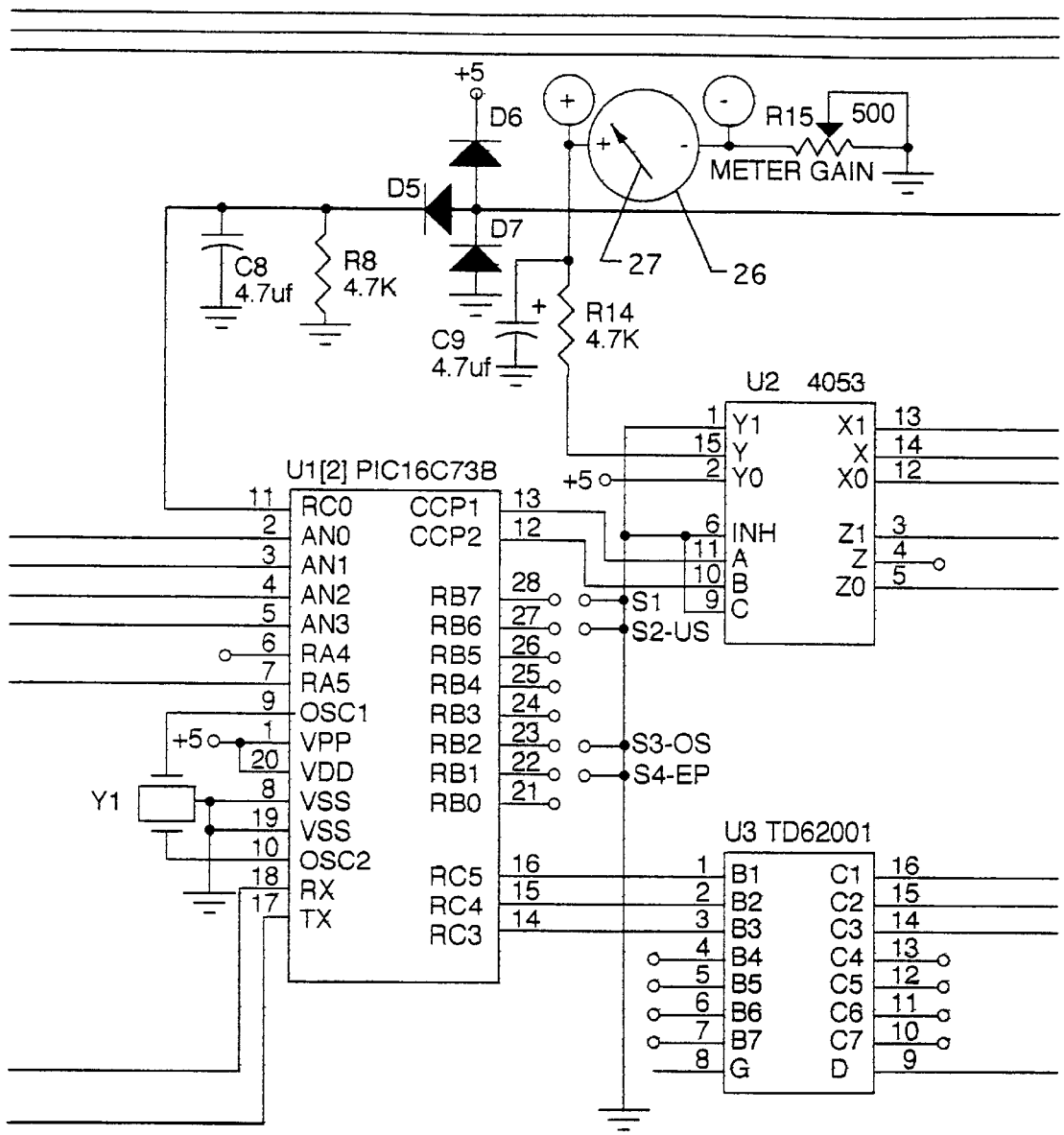
Figure 2C:
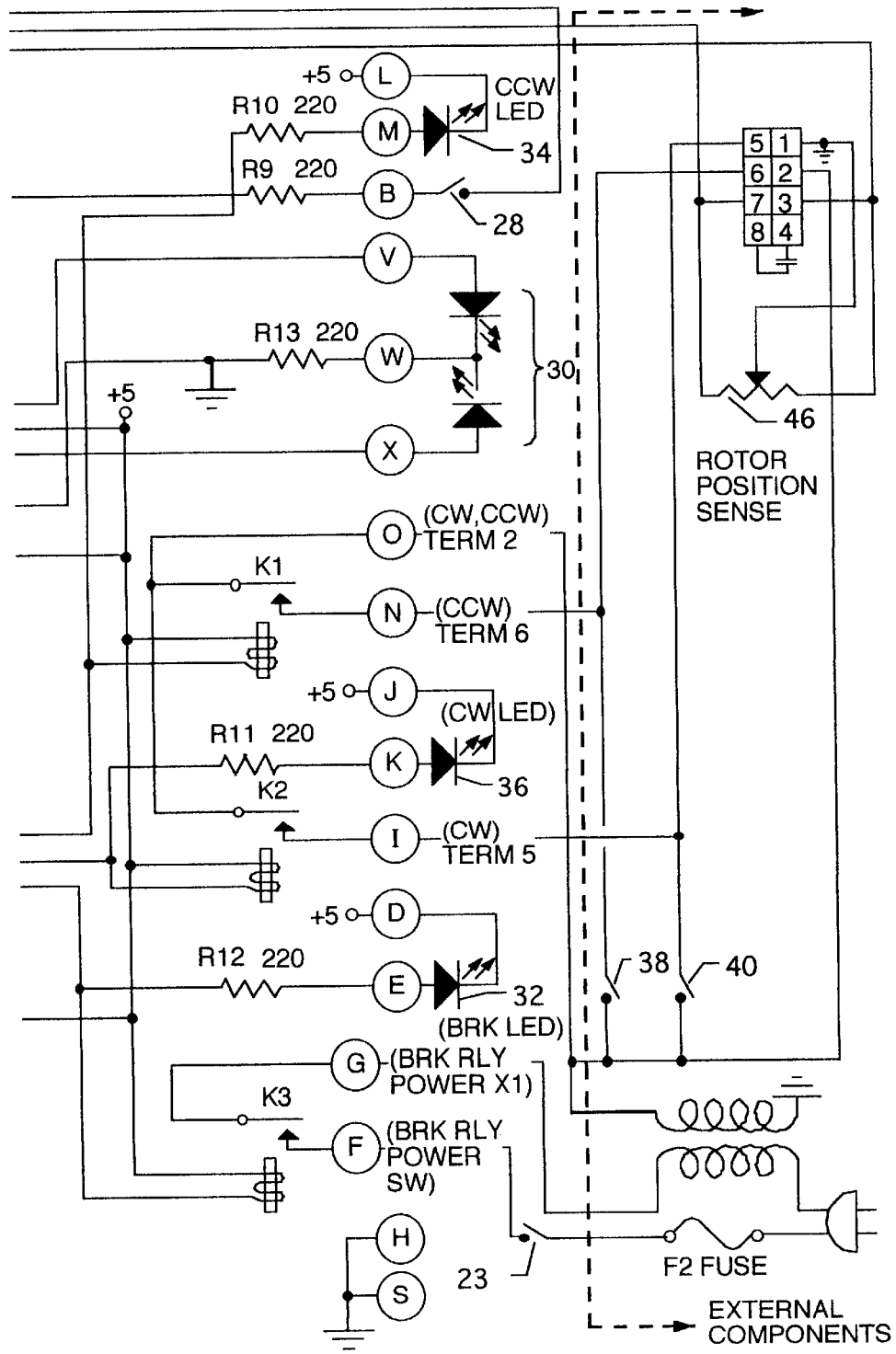

FIG. 2 illustrates the relative alignment of FIGS. 2A, 2B and 2C.

FIGS. 2A, 2B and 2C illustrate in combination the circuit diagram for the automatic antenna direction controller 10, as also connected to external components. The automatic antenna direction controller 10 is composed of, but not limited to, the following components: power supply, microprocessor, pulse width modulators (PWMs), analog inputs, digital inputs, relays, RS-232 interface, LED indicators and software. External components connected to the automatic antenna direction controller 10 are shown to the right of a dashed line labeled "external components."

Power Supply. Since only voltages unsuitable for a linear regulator are available inside the rotor control box 11, an on-board switching power supply is utilized. An extremely simple circuit is incorporated due to the low current requirements. U4, D8, L1, C10 and C11 constitute the entire switching power supply design. The switching power supply requires a DC input and fuse F1, and diodes D9–D12 are configured as a full bridge rectifier to convert the AC input to DC. Decoupling capacitors C16–C18 are also incorporated.

Microprocessor. The microprocessor U1 is a microchip PIC16C73B selected due to its high level of integration. A crystal resonator Y1 is used as a precision time reference required for serial communication. The processor U1 has an internal reset circuit requiring no additional external components.

PWMs. The microprocessor U1 contains two pulse width modulators (PWMs). The PWMs are used to control the movement of the meter needle 27 of the direction indicator meter 26 and the multi-color status LED 30. An analog multi-plexer (MUX-U2) is controlled by the PWMs and used to provide a precision 0.0VDC or 5.0VDC to the multi-color status LED 30 or to the direction indicator meter 26 movement's low pass filter. The direction indicator meter 26 movement uses a simple low pass filter C9 and R14 to change the duty cycle of the PWM into a current source for the 1 ma full scale analog direction indicator meter 26. Although an analog directional indicator meter 26 is incorporated, alternate digital readouts simulating a graphic direction indicator meter and meter needle can be utilized. Such readouts could also be such as, but not limited to, alpha-numeric readouts, compass style displays or other suitable digital displays. R15 is used to calibrate the full scale deflection of the meter. The frequency of the PWM used for the multi-color status LED 30 is high enough so that the flicker is not perceivable.

Analog Inputs. Analog inputs are used to determine the impedance of the rotor position sense potentiometer 46. A bridge network R1, R2, R4, R5 is used to condition the rotor position sense potentiometer sense circuit. Clamping diodes D1–D4 and series impedance resistors R3 and R6 protect the microprocessor U1 from erroneous inputs. The bridge network provides the benefit of isolating the rotor position sense potentiometer 46 impedance measurement from changes in line impedance (provided the line impedances are balanced). Filtering capacitors C1–C6 are included to prevent 60 hz noise and RF energy from affecting the rotor position sensing. The set point potentiometer 20 is connected directly to the microprocessor U1 analog input and is not protected due to the signal being internal to the automatic antenna direction controller 10. The set point potentiometer 20 is attached to pointer knob 24.

Digital Inputs. The brake switch sense circuit uses R9, C8 and D5 as a half-wave rectifier. R8 is used to bleed off energy stored in C8 after the command/brake release paddle switch 28 is released. R9, D6 and D7 are used to clamp the brake switch sense to valid levels and provide protection from erroneous inputs.

Relays. U3 is used to drive the relays K1, K2 and K3, as well as to provide protection from the current surge resulting from the relay inductor field collapse. Relay K1 is used to emulate the closure of the counterclockwise paddle switch 38. Relay K2 is used to emulate the closure of the clockwise paddle switch 40. Relay K3 is used to emulate the closure of the command/brake release paddle switch 28. R10–R13 are used to drive the various annunciator LEDs.

RS-232 Interface. U5 performs the signal conditioning necessary to interface with RS-232. This is done with charge pumps C12–C15 that create low precision positive and negative voltage references that are RS-232 voltage level compliant.

Software. The microprocessor U1 contains programmable instruction memory. The microprocessor U1 is programmed with the control algorithms, serial communication, PWMs, analog-to-digital conversion, state machines and lookup tables necessary to produce the functionality described in the user's manual. Software developed in assembly language is incorporated specifically for this application. RS-232 functionality is enabled/disabled by using different programs in the microprocessor U1.

There are several software options that can be disabled by using jumpers on the PC board. They are as follows.

Preset Electronic End Points. Recommended for all users. Prevents the system from slamming into the end stops of the rotor 12 by removing power from the rotor motor 5 degrees before the end point is reached. Preset electronic end points is disabled by installing a jumper wire between pin 22 of U1 and ground hole S4-EP next to pin 22.

Overshoot Protection. Overshoot protection removes power from the rotator motor 3 degrees before the desired bearing is reached, allowing the rotor 12 and antenna system to coast to the desired heading. Overshoot protection is disabled by installing a jumper wire between pin 23 of U1 and the ground hole S3-OS next to pin 23.

Unstick Routine. Some rotors often encounter brake jams, where the brake cannot release because of lateral pressure. The usual cure is to try to turn the rotor in the opposite direction for a second, then reverse. The automatic antenna direction controller includes an automatic brake unstick routine. The automatic brake unstick routine is disabled by installing a jumper between pin 27 of U1 to the ground hole S2-US just to the right of pin 27.

90° Offset Mode. The present invention also features a 90° offset mode for use where an antenna utilizing the same rotor and same mast may be mounted at a right angle to a primary antenna, to avoid interference between the two antennas. The meter direction indicating needle, when in the 90° offset mode, shifts 90° to the right or to the left as controlled by an option, so that the meter needle 27 is pointed correctly for the secondary antenna. If the movement when being adjusted requires that the meter needle 27 goes past the minimum or maximum deflection range of the direction indicator meter 26, the circuitry moves the meter needle 27 to the other end of the scale of the direction indicator meter 26 to correct the reading.

Figure 3:
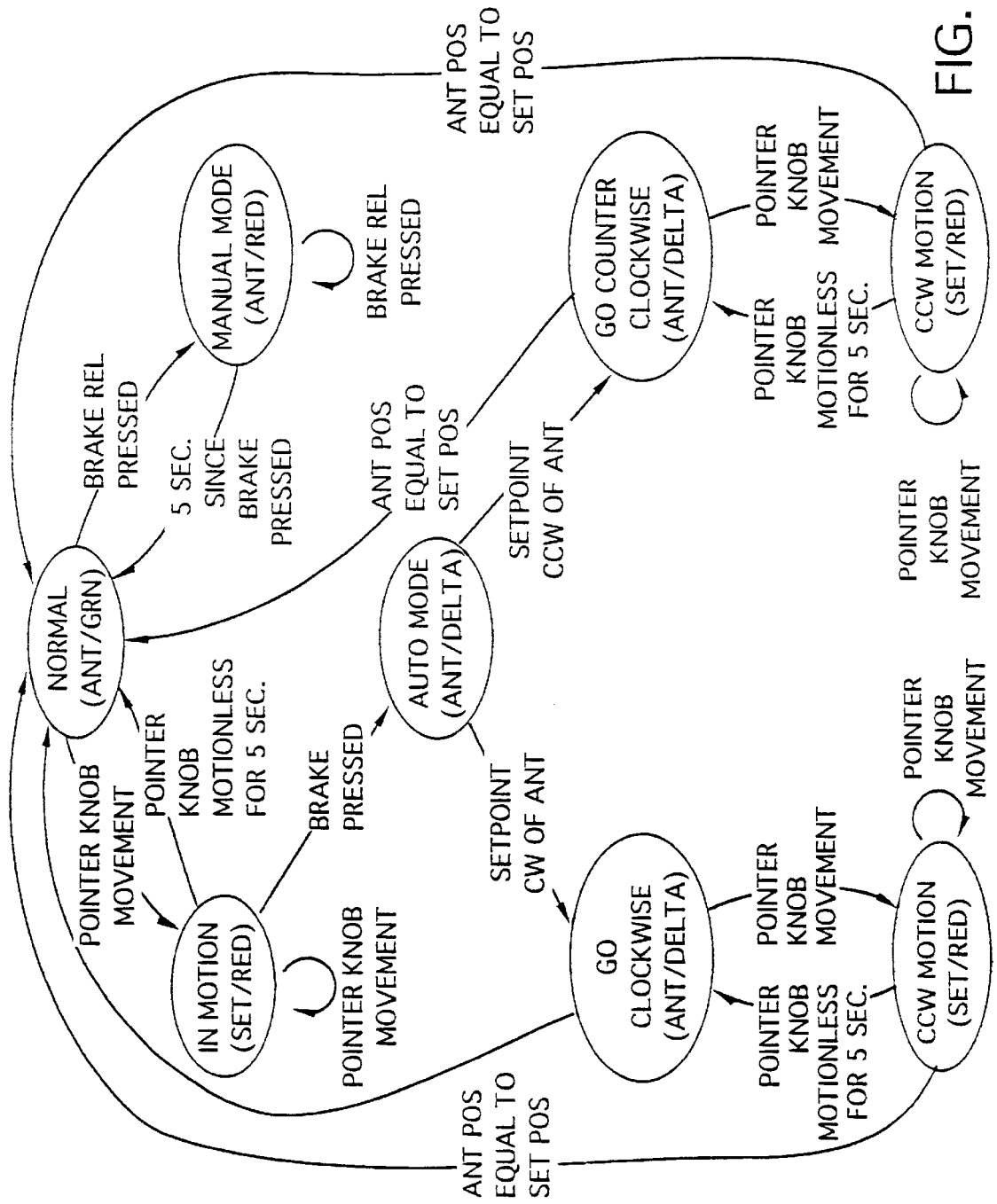

FIG. 3 illustrates a state transition chart indicating operation of the automatic antenna direction controller 10. Abbreviations are indicated herein for accompaniment, as well as notes to FIG. 3 pertaining to the chart:

Key:
  ANT=current antenna position
  SET=current set pot position
  DELTA=linear transition from red to green based on percentage of rotation completed.
Notes:
  Meter wiggle used to annunciate approximate ANT position when open detected.
  LED used to indicate JAM with slow blink.
  LED used to indicate offset mode with four rapid blinks.

Mode of Operation

The automatic antenna direction controller 10 adaptation to a rotor control box 11 offers the following operating modes:

Manual Mode. Use of the rotator control box 11 is essentially the same such as in unmodified rotor box versions. Actuation of the command/brake release paddle switch 28 releases the rotor brake. Subsequent to such actuation, either the counterclockwise paddle switch 38 or the clockwise paddle switch 40 is actuated depending upon the desired heading required. The red brake release LED 32 and appropriate red counterclockwise rotation LED 34 or red clockwise rotation LED 36 will illuminate. The only difference from an unmodified factory original unit is that automatic antenna direction controller 10 adds an automatic five-second brake application delay. After release of the command/brake release paddle switch 28, the brake will not engage for another five seconds, thus allowing the antenna to stabilize first in a stopped position, thereby enhancing the life of the rotor, the tower, and the antenna.

Automatic Mode. In the automatic mode, the pointer knob 24 becomes the pointing control. Turning the pointer knob 24 captures control of the meter needle 27 so that the operator can "drive" the meter needle 27 precisely to the desired bearing, which is read by the circuitry of the automatic antenna direction controller 10. Then, pressing and releasing the command/brake release paddle switch 28 "enters" the command, starts rotation, and frees up the operator's hands. The meter needle 27, which at this time is no longer captured by the automatic antenna direction controller 10, returns to the actual real time reading mode where the indicated antenna position is shown and tracks the antenna as it moves. The automatic antenna direction controller 10, having read the desired bearing, begins the rotation sequence to turn the antenna to the desired bearing. The meter needle 27, now in the real time mode, tracks the changing azimuth of the antenna which is displayed by the meter needle 27 on the direction indicator meter 26. When the antenna reaches the new bearing, appropriate power is removed from the rotor 12 to cease rotation, and after a five-second delay the brake sets. Various LEDs, as described herein, signal the motion status, rotation in clockwise or counterclockwise status and brake status.

If the operator turns the pointer knob 24, but does not execute the new heading by pressing the command/brake release paddle switch 28 briefly, after five seconds the command is abandoned, and the meter needle 27 returns to the actual bearing.

Note that the top LED, which is the multi-color status LED 30, changes color during an operation. Its steady state is green. Turning the pointer knob 24 changes the color of the multi-color status LED 30 to red. Pressing the command/brake release paddle switch 28 to start rotor rotation causes the multi-color status LED 30 to change to orange. Then, as the antenna moves to the new bearing, the status multi-color LED 30 color changes to orange, a mid-range indication, to green, giving the operator an indication of how close the antenna is to the final selected position. This is especially useful in case the operator may have forgotten the commanded bearing.

The red brake release LED 32, below the multi-color status LED 30, turns on whenever the brake is released whether in the automatic mode or in the manual mode. Whenever the brake is set, the red brake release LED 32 is off.

Two red LEDs of the front panel 22 indicate the direction the antenna is turning. The red counterclockwise rotation LED 34 is located above the counterclockwise paddle switch 38 and the red clockwise rotation LED 36 is located in the lower right region of the panel 22 above the clockwise paddle switch 40. The red counterclockwise rotation LED 34 and the red clockwise rotation LED 36 also illuminate when the rotor 12 is being operated under manual control.

While the antenna is turning to a new bearing, the operator can change the heading (set point), provided it does not require the direction of rotation to reverse. If the operator tries to turn the pointer knob 24 back in the opposite direction to pass the point where the antenna actually is, rotation stops immediately at that point. In this case, the new bearing is held and the brake is applied after a 5-second delay. Pressing the command/brake release paddle switch 28 to release the brake will start rotation of the antenna to the updated bearing. At any time during operation, rotation can be halted by simply pressing the command/brake release paddle switch 28 momentarily, thereby causing rotation to stop and causing brake engagement after a 5-second delay.

After a command is executed, but before the brake has set, a new rotation command can be given by pointing the pointer knob 24, but note that the command cannot be executed until the brake has set. Once the red brake release LED 32 extinguishes, indicating that the brake is set, the command/brake release paddle switch 28 can be pressed again momentarily, which will start execution of the latest command.

When the operator begins turning the pointer knob 24, a situation may well exist where the indicator needle 27 and the set point potentiometer 20 are not in sync. This situation automatically corrects itself. The following will help for understanding what is happening.

An unsynchronized state almost always occurs the first time the rotor 12 is used, and will happen anytime the rotor 12 is moved by the clockwise and counterclockwise paddle switches 40 and 38 or an RS-232 input. An unsynchronized state occurs if a command entry by the command/brake release paddle switch 28 is not executed, leaving the set point potentiometer 20 position at a different point from where the antenna actually is pointing. When an unsynchronized state occurs, as soon the operator turns the pointer knob 24, the meter needle 27, when captured, will move to the sense position of the rotor position sense potentiometer 46 (FIG. 2C). This position may well have no present relationship with the actual position of the antenna. In any case, the operator can simply turn the pointer knob 24 to drive the meter needle 27 to the desired bearing, which also resynchronizes the system. Pressing the command/brake release paddle switch 28 momentarily will properly turn the antenna to the new bearing.

The automatic antenna direction controller 10 includes three user selectable options. Each of these options is normally enabled unless the builder deselects them while assembling the printed circuit board. They are (1) preset electronic endpoints; (2) overshoot protection, and (3) an unstick routine.

Unstick Routine. If the unstick option is programmed, when directional command execution begins, the rotor 12 first pulses in the opposite direction for one second in case the brake is stuck, pauses one second, then turns in the proper direction. Note that in particularly cold weather, this routine may not be enough to unjam a brake, though it will normally do so. In such cases, it may be necessary to rock the rotor back and forth multiple times, manually using the command/brake release paddle switch 28.

Electronic End Point Option. This program option adds electronic end points. If enabled, this option limits the rotation range to exclude the last 5 degrees on either end of the scale of the direction indicator meter 26, preventing the rotor 12 from jamming on the end stop. The rotor 12 can still be manually turned into these areas, if needed.

Though not an extremely common problem, some rotors have been known to jam themselves at the end stop, stopping in such a position that the limit switch is opened, so that it is impossible to turn the rotor 12 back. The end point option virtually eliminates the possibility of this happening as long as it is enabled. Even though the operator turns the pointer knob 24 to the end point of the rotation range and execute, the rotor will not enter the last 5 degrees of range at either end. If it is desired to move the antenna into that range for whatever reason, it is still possible to do so by the use of the command/brake release paddle switch 28 and the appropriate clockwise or counterclockwise paddle switch 40 or 38.

Overshoot Option. This option turns off the motor in the rotor 12 three degrees before the set point is reached, so that the antenna can coast into the setting. This option is useful on rotors when used with all but the smallest antennas, and is normally recommended. Note, however, that the overshoot option will frequently result in small positional errors, depending on the actual coasting, which in turn may be affected by wind. The error will usually be less than 2 degrees and is of little consequence in real terms.

In the alternative, users of side mounted antennas can substitute an optional CPU for their automatic antenna direction controller 10 that sets the end points at custom bearings to avoid bumping into the tower.

Various modifications can be made to the present invention without departing from the apparent scope hereof.

It is claimed:

1. In combination, an antenna rotating system comprising:
   a. a rotor control means connected to a rotor which supports and rotates an antenna; and,
   b. a control means connected to said rotor control means for rotating said antenna to a predetermined heading after a control means is used to set a compass meter, whereby briefly touching a brake release causes said rotor to rotate to said predetermined heading.

2. The automatic antenna direction controller of claim 1 and further comprising:
   an LED status indicator system for visually indicating whether the dual use meter is displaying a real time status in first mode or displaying a selected heading in second mode.

3. The automatic antenna direction controller of claim 1 and further comprising:
   an LED status indicator for clockwise rotation; and
   an LED status indicator for counterclockwise rotation.

4. The automatic antenna direction controller of claim 3, wherein the LED status indicator for clockwise rotation and counterclockwise rotation each further include different color displays, the different color displays being indicative of percentage of rotation in real time completed toward the selected heading whitest the dual use meter is displaying a selected heading in second mode.

5. The automatic antenna direction controller of claim 1 and further comprising:
   a pointer knob, said pointer knob, when rotated capturing the needle from real time indication in first mode and allows repositioning of said needle to a selected heading in second mode.

6. The automatic antenna direction controller of claim 5 and further comprising:
   a command switch which initiates rotation of the rotor toward a heading selected by the pointer knob and indicated by the needle when in second mode.

7. The automatic antenna direction controller of claim 6 and further comprising:
   a brake control switch controlled by the command switch.

8. The automatic antenna direction controller of claim 7 and further comprising:
   manual switches for clockwise rotation and counterclockwise rotation, said switches being ineffective when the brake control switch has not been activated.

9. The automatic antenna direction controller of claim 1 and further comprising:
   an RS-232 connector for enabling optional computer interfacing of the automatic direction controller with a personal computer.

10. A method of controlling a rotatably directable antenna, the method comprising the steps of:
   a. providing an automatic antenna direction controller for use with a rotor control box, a rotor under control of the rotor control box, a mast extending from the rotor and a boom of an antenna array being carried by the mast, said automatic antenna direction controller including a dual use direction indicator meter, said dual use direction indicator meter having indicia relating to a range of orientation headings and a meter needle pointing toward a heading amongst the range of indicia, said dual use meter displaying, when in a first mode, an indication of a real time heading for the rotor and alternatively displaying, when in a second mode, a selected heading for the rotor; and,
   b. selecting a heading while in the second mode.

11. The method of claim 10, wherein the automatic antenna direction controller further includes:
   a. an LED status indicator system for visually indicating whether the dual use meter is displaying a real time status in first mode or displaying a selected heading in second mode; and,
   b. observing the LED status indicator system to determine whether the dual use meter is in first or second mode.

12. The method of claim 10, wherein the automatic antenna direction controller further includes:
   a. an LED status indicator for clockwise rotation and an LED status indicator for counterclockwise rotation; and,
   b. observing both the clockwise and counterclockwise indicators to determine which rotation is occurring.

13. The method of claim 12, wherein the LED status indicator for clockwise rotation and counterclockwise rotation each further include different color displays, the different color displays being indicative of percentage of rotation in real time completed toward the selected heading whilst the dual use meter is displaying a selected heading in second mode; and observing the color display to determine the percentage of completion of rotation and type of rotation.

14. The method of claim 10, wherein the automatic antenna direction controller further includes:
   a. a pointer knob, said pointer knob, when rotated capturing the needle from real time indication in first mode and allows repositioning of said needle to a selected heading in second mode; and,
   b. rotating the pointer knob to select a heading.

15. The method of claim 14, wherein the automatic antenna direction controller further includes:
   a. a command switch which initiates rotation of the rotor toward a heading selected by the pointer knob and indicated by the needle when in second mode; and,
   b. initiating rotation toward a selected heading.

16. The method of claim 15, wherein the automatic antenna direction controller further includes:
   a. a brake control switch controlled by the command switch; and,
   b. actuating the brake control switch.

17. The method of claim 16, wherein the automatic antenna direction controller further includes;
   a. manual switches for clockwise rotation and counterclockwise rotation, said switches being ineffective when the brake control switch has not been activated; and,
   b. actuating one of the manual switches subsequent to the step of actuating the brake control switch.

18. An automatic antenna direction controller kit comprising:
   a. an automatic antenna direction controller for use with a rotor control box, a rotor under control of the rotor control box, a mast extending from the rotor and a boom of an antenna array being carried by the mast, said automatic antenna direction controller including:
      (1) a dual use direction indicator meter, said dual use direction indicator meter having indicia relating to a range of orientation headings and a meter needle pointing toward a heading amongst the range of indicia, said dual use meter displaying, when in a first mode, an indication of a real time heading for the rotor and alternatively displaying, when in a second mode, a selected heading for the rotor; and,
   b. instructions for connecting the controller to the rotor control box.

* * * * *